(12) United States Patent
Fabian et al.

(10) Patent No.: US 9,796,617 B2
(45) Date of Patent: Oct. 24, 2017

(54) METHOD FOR PRODUCING TITANIUM-DOPED SYNTHETIC QUARTZ GLASS

(71) Applicant: Heraeus Quarzglas GmbH & Co. KG, Hanau (DE)

(72) Inventors: Heinz Fabian, Grossostheim (DE); Stephan Thomas, Grosskrotzenburg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/767,466

(22) PCT Filed: Feb. 7, 2014

(86) PCT No.: PCT/EP2014/052450
§ 371 (c)(1),
(2) Date: Aug. 12, 2015

(87) PCT Pub. No.: WO2014/124877
PCT Pub. Date: Aug. 21, 2014

(65) Prior Publication Data
US 2015/0376047 A1 Dec. 31, 2015

(30) Foreign Application Priority Data
Feb. 12, 2013 (DE) .................. 10 2013 202 256

(51) Int. Cl.
*C03B 19/14* (2006.01)
*C03C 3/06* (2006.01)

(52) U.S. Cl.
CPC .......... *C03B 19/1415* (2013.01); *C03B 19/14* (2013.01); *C03C 3/06* (2013.01);
(Continued)

(58) Field of Classification Search
CPC .......... C03B 37/01413; C03B 19/1415; C03B 2201/42; C03B 2207/85; C03B 2201/02; C03B 2201/12; C03B 2201/20
See application file for complete search history.

(56) References Cited

U.S. PATENT DOCUMENTS 3,607,182 A * 9/1971 Leibowitz ............. C03B 17/064
65/195
3,663,192 A * 5/1972 Perry .................... C03B 37/081
65/335
(Continued)

FOREIGN PATENT DOCUMENTS

WO 9954259 10/1999
WO 0192172 12/2001
(Continued)

OTHER PUBLICATIONS

Search Report for International Application No. PCT/EP2014/052450 dated Apr. 24, 2014 (3 pgs.).
(Continued)

*Primary Examiner* — Jodi C Franklin
(74) *Attorney, Agent, or Firm* — Dicke, Billig & Czaja, PLLC (57) ABSTRACT

A method for producing titanium-doped synthetic quartz glass includes:
(A) providing a liquid $SiO_2$ feedstock material that comprises more than 60% by weight of the polyalkylsiloxane D4;
(B) evaporating the liquid $SiO_2$ feedstock material to produce a gaseous $SiO_2$ feedstock vapor;
(C) evaporating a liquid TiO2 feedstock material to produce a gaseous TiO2 feedstock vapor;
(D) converting the $SiO_2$ feedstock vapor and the TiO2 feedstock vapor into SiO2 particles and TiO2 particles, respectively;
(Continued)

(E) depositing the SiO2 particles and the TiO2 particles on a deposition surface while forming a titanium-doped $SiO_2$ soot body;

(F) vitrifying the titanium-doped $SiO_2$ soot body while forming the synthetic quartz glass, whereby the TiO2 concentration of the synthetic quartz glass is between 5% by weight and 11% by weight.

The liquid $SiO_2$ feedstock material comprises at least one additional component made of the polyalkylsiloxane D3 having a weight fraction of mD3 and one additional component made of the polyalkylsiloxane D5 having a weight fraction of mD5 at a weight ratio of mD3/mD5 in a range of 0.01 to 1, and the liquid $SiO_2$ feedstock material provided is evaporated while maintaining the weight ratio of mD3/mD5 and at least 99% by weight thereof are evaporated to form the gaseous $SiO_2$ feedstock vapor.

20 Claims, 1 Drawing Sheet

(52) U.S. Cl.
CPC ...... *C03B 2201/12* (2013.01); *C03B 2201/42* (2013.01); *C03B 2207/32* (2013.01); *C03B 2207/34* (2013.01); *C03C 2201/42* (2013.01); *C03C 2203/40* (2013.01)

(56) References Cited

U.S. PATENT DOCUMENTS

| | | | | |
|---|---|---|---|---|
| 4,214,886 A * | 7/1980 | Shay | C03B 17/02 | 65/121 |
| 4,556,726 A * | 12/1985 | Reedy | C07F 7/21 | 556/460 |
| 5,043,002 A * | 8/1991 | Dobbins | C03B 19/1415 | 423/336 |
| 5,152,819 A * | 10/1992 | Blackwell | C03B 19/1415 | 423/336 |
| 5,841,933 A * | 11/1998 | Hoaglin | C03B 37/01413 | 385/142 |
| 5,879,649 A * | 3/1999 | Henderson | C03B 19/1415 | 423/336 |
| 5,970,751 A * | 10/1999 | Maxon | C03B 19/14 | 501/38 |
| 6,499,317 B1 * | 12/2002 | Ikuta | C03B 19/1453 | 501/30 |
| 8,007,913 B2 * | 8/2011 | Coppola | B32B 17/06 | 428/426 |
| 8,490,432 B2 * | 7/2013 | Berkey | G05B 21/02 | 65/162 |
| 8,931,309 B2 * | 1/2015 | Abdul-Rahman | C03B 17/061 | 65/203 |
| 2002/0005404 A1 * | 1/2002 | Maeda | C03B 29/08 | 219/520 |
| 2004/0025542 A1 * | 2/2004 | Ball | C03B 19/01 | 65/391 |
| 2006/0016219 A1 * | 1/2006 | Pitbladdo | C03B 17/064 | 65/29.21 |
| 2008/0282736 A1 * | 11/2008 | Filippov | C03B 17/064 | 65/90 |
| 2011/0126587 A1 * | 6/2011 | Berkey | G05B 21/02 | 65/29.21 |
| 2011/0217011 A1 * | 9/2011 | Bennett | G02B 6/0288 | 385/124 |
| 2012/0183719 A1 * | 7/2012 | Kuehn | C03B 19/1453 | 428/67 |
| 2012/0276291 A1 * | 11/2012 | Bird | C03B 37/01413 | 427/248.1 |
| 2013/0133370 A1 * | 5/2013 | Boratav | C03B 17/064 | 65/84 |
| 2013/0133376 A1 * | 5/2013 | Fabian | C03B 20/00 | 65/395 |
| 2013/0133377 A1 * | 5/2013 | Fabian | C03B 20/00 | 65/414 |
| 2014/0318182 A1 * | 10/2014 | Coppola | C03B 17/067 | 65/29.21 |
| 2015/0252266 A1 * | 9/2015 | Wang | C07F 7/0852 | 528/28 |

FOREIGN PATENT DOCUMENTS

| | | |
|---|---|---|
| WO | 2004065314 | 8/2004 |
| WO | 2013076195 | 5/2013 |

OTHER PUBLICATIONS

Translation of the Written Opinion of the International Searching Authority for International Application No. PCT/EP2014/052450 dated Apr. 24, 2014 (10 pgs.).

* cited by examiner

METHOD FOR PRODUCING TITANIUM-DOPED SYNTHETIC QUARTZ GLASS

CROSS REFERENCE TO RELATED APPLICATION

This Utility Patent Application claims the benefit of the filing date of German Application No. DE 10 2013 202 256.5, filed Feb. 12, 2013, and International Application No. PCT/EP2014/052450, filed Feb. 7, 2014, both of which are herein incorporated by reference.

BACKGROUND

The invention relates to a method for producing titanium-doped synthetic quartz glass.

Producing synthetic quartz glass for commercial applications, it is customary to generate $SiO_2$ particles from a silicon-containing starting substance in a CVD (chemical vapor deposition) procedure by means of hydrolysis and/or oxidation followed by precipitation of these on a support. The method can be subdivided into external and internal deposition methods. In external deposition methods, $SiO_2$ particles are applied onto the outside of a rotating support. Examples to be mentioned include the OVD method (outside vapor phase deposition), VAD method (vapor phase axial deposition) or the PECVD method (plasma-enhanced chemical vapor deposition). The most prominent example of an internal deposition method is the MCVD method (modified chemical vapor deposition), in which $SiO_2$ particles are deposited on the internal wall of a tube that is heated from outside. It shall be noted in this context that the simplified chemical notation of chemical compounds (e.g. "SiO2") and the molecular formula (e.g. "$SiO_2$") are considered to be equal and are used interchangeably herein.

The reflecting optical systems and masks used In EUV lithography (extreme ultraviolet) require substrate materials that show very little to no noticeable thermal expansion in the temperature range of 20° C. to 50° C. This requirement can be met through titanium-doped quartz glass. A method for producing such titanium-doped synthetic quartz glass (often referred to as ULE glass) is described in U.S. Pat. No. 5,970,751 A.

Printed patent specification U.S. Pat. No. 5,970,751 A describes the use of polyalkylsiloxane (also referred to as "siloxane" for short) for producing titanium dioxide-doped quartz glass. In the description of the invention hereinafter, titanium dioxide-doped quartz glass is also referred to as titanium-doped quartz glass.

Polyalkylsiloxanes are characterised by having a particularly high fraction of silicon per weight fraction, which contributes to the economic efficiency of their use in the production of synthetic quartz glass. The substance group of siloxanes can be subdivided into open-chain polyalkylsiloxanes and closed-chain polyalkylsiloxanes. The general molecular formula of polyalkylsiloxanes is $Si_pO_p(R)_{2p}$, with P being an integer $\geq 2$. The residue "R" is an alkyl group, i.e. a methyl group in the simplest case. Due to the availability of commercial quantities at high purity, octamethylcyclotetrasiloxane (OMCTS) is currently used preferably. According to a notation introduced by General Electric Inc., said substance is also referred to as "D4", whereby "D" represents the $[(CH_3)_2Si]$-0-group.

However, the production of pure D4 necessitates a time-consuming and costly distillation procedure due to the relatively high boiling temperature and the chemical similarity to other polyalkylcyclosiloxanes such as hexamethylcyclotrisiloxane (D3), decamethylcyclopentasiloxane (D5), dodecamethylcyclohexasiloxane (D6), and tetradecamethylcycloheptasiloxane (D7). Please refer to U.S. Pat. No. 5,879,649 A in this context.

The production methods described in the prior art lead to inhomogeneities in the materials in large-volume cylinder-shaped soot bodies with external diameters of more than 300 mm, for example in the form of axial, radial or azimuthal variations of the hydroxy groups or titanium concentration or viscosity values.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the FIGURE(S) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

One aspect of the present invention is to create a method for producing $SiO_2$ soot bodies for titanium-doped synthetic quartz glass that is characterised by high homogeneity of the materials, in which the disadvantages mentioned above are circumvented, in particular to provide a method that permits the production of $SiO_2$—TiO2 soot bodies characterised by high homogeneity of the materials, in particular in large-volume cylinder-shaped soot bodies with external diameters of more than 300 mm for titanium-doped synthetic quartz glass.

A method having the features of patent claim 1 is proposed to meet said object. The dependent claims each specify preferred developments.

The invention relates to a method for producing titanium-doped synthetic quartz glass comprising the following procedural steps:

(A) providing a liquid $SiO_2$ feedstock material that comprises more than 60% by weight of the polyalkylsiloxane D4;

(B) evaporating the liquid $SiO_2$ feedstock material to produce a gaseous $SiO_2$ feedstock vapor;

(C) evaporating a liquid TiO2 feedstock material to produce a gaseous TiO2 feedstock vapor;

(D) converting the $SiO_2$ feedstock vapor and the TiO2 feedstock vapor into SiO2 particles and TiO2 particles, respectively;

(E) depositing the SiO2 particles and the TiO2 particles on a deposition surface while forming a titanium-doped $SiO_2$ soot body;

(F) vitrifying the titanium-doped $SiO_2$ soot body while forming the synthetic quartz glass, whereby the TiO2 concentration of the synthetic quartz glass is between 5% by weight and 11% by weight.

According to the scope of one embodiment of the invention, the liquid $SiO_2$ feedstock material comprises at least one additional component made of the polyalkylsiloxane D3 having a weight fraction of mD3 and one additional component made of the polyalkylsiloxane D5 having a weight fraction of mD5 at a weight ratio of mD3/mD5 in a range of 0.01 to 1, and the liquid $SiO_2$ feedstock material provided is evaporated while maintaining the weight ratio of mD3/mD5 and at least 99% by weight thereof are evaporated to form the gaseous $SiO_2$ feedstock vapor.

In contrast to the known methods, in which a feedstock material consisting of a single defined silicon compound that is as pure as possible is used, one embodiment of the invention proposes an $SiO_2$ feedstock material that is present as a mixture of different polyalkylsiloxanes. Octamethylcyclotetrasiloxane (also referred to as D4 herein) is the main component of said mixture. In addition to D4, the mixture contains chemically similar polyalkylsiloxanes, namely those with a lower molecular mass than D4 (including D3) and those with a higher molecular mass than D4 (including D5). The additional ingredients of the feedstock material summarised by the term of "additional components" thus have molecular masses and boiling temperatures that deviate from the relative molecular mass of D4 (approx. 297 g/mol) and the boiling temperature of D4 (approx. 175° C.) to be either higher or lower.

Basically, the method according to one embodiment of the invention is characterised through three features that act in concert. The first feature includes that the liquid $SiO_2$ feedstock material—also referred to as feedstock material hereinafter—contains not only the major component D4, but also two further polyalkylsiloxanes. These are the additional components D3 and D5. The ratio of the fractions of D3 and D5 in the liquid $SiO_2$ feedstock material is not arbitrary, but rather is selected to be within a pre-defined range. The second essential feature of the method according to one embodiment of the invention requires complete transitioning of the liquid $SiO_2$ feedstock material—and thus of the weight fractions of mD3 and mD5 as well—to the gas phase. Accordingly, not only the liquid comprises a pre-determined and narrowly-limited ratio of D3 to D5, but the same is true of the gaseous $SiO_2$ feedstock vapor as well—which is also referred to as feedstock vapor hereinafter.

The third feature includes the use of a TiO2 feedstock material—also referred to as doping material hereinafter. The method according to one embodiment of the invention can be used to produce $SiO_2$ soot bodies and EUV quartz glass bodies that comprise particular high homogeneity of their materials and TiO2 homogeneity beyond the currently common standards.

In the scope of one embodiment of the invention, the term, "weight fraction", shall refer to a relative parameter that results from the mass of the corresponding additional component divided by the total mass of the liquid $SiO_2$ feedstock material. Therefore, the weight ratio mD3/mD5 of the two weight fractions of the additional components is a parameter without units that can be determined by dividing the two relative weight fractions.

In the scope of one embodiment of the invention, the term, dew point, shall refer to the temperature at which an equilibrium state of condensing and evaporating liquid is established.

In the scope of one embodiment of the invention, stating that the evaporation proceeds "while maintaining the weight ratio", shall mean that the numerical value of a ratio of the weight ratio G_liquid=mD3/mD5 of the liquid $SiO_2$ feedstock material and of the weight ratio G_vapor=mD3/mD5 of the gaseous $SiO_2$ feedstock vapor is no more than ±500 parts per million (ppm hereinafter; in English "parts per million parts"), preferably no more than ±250 ppm, particularly preferably no more than ±100 ppm, in particular no more than ±50 ppm. In this context, the ratio is calculated as follows:

$$=(G\_liquid-G\_vapor)/G\_liquid.$$

Accordingly, the weight ratio, i.e. the ratio of the fraction D3 to the fraction D5, should not be changed through the evaporation to an extent that shifts the ratio by more than ±500 ppm, preferably by more than ±250 ppm, particularly preferably by more than ±100 ppm.

In the scope of one embodiment of the invention, stating that SiO2 particles and TiO2 particles are being deposited shall mean joint deposition of SiO2-TiO2 particles, in particular as connected substances. It is obvious to an expert in the art that what happens is not that pure SiO2 particles and pure TiO2 particles are formed and deposited separately. Rather, primary SiO2 particles comprising a TiO2 doping are formed in the flame. These primary SiO2 particles turn into SiO2 agglomerates containing added TiO2 while still in the flame.

In the scope of one embodiment of the invention, stating that "at least 99% by weight of the liquid $SiO_2$ feedstock material is evaporated to form the gaseous $SiO_2$ feedstock vapor" shall mean that at least 99% by weight of the liquid $SiO_2$ feedstock material flowing into the evaporation process are also transitioned into the gas phase. According to the goal of the method according to one embodiment of the invention, the conversion of the liquid feedstock material into the gas phase proceeds such that it is complete. The gaseous $SiO_2$ feedstock vapor thus attained is then to be converted into $SiO_2$ particles by means of oxidation and/or pyrolysis and/or hydrolysis. Due to the effort being made to attain complete conversion—i.e. of at least 99% by weight (also referred to as % by wt.)—of the feedstock material to the feedstock vapor, the weight ratio of D3 to D5 is also transferred from the liquid phase to the gas phase. These efforts ensure that the $SiO_2$ feedstock vapor has a predefined ratio of D3 to D5. $SiO_2$ soot bodies and thus quartz glass characterised by particularly high homogeneity can be produced only if the weight ratio mD3/mD5 is within a pre-defined range. An arbitrarily mixed mixture of polyalkylsiloxanes comprising weight fractions of D3 and D5 different from the claimed range does not allow quartz glass having the same special homogeneity to be produced. A particularly preferred variant of an embodiment is characterised in that liquid $SiO_2$ feedstock material is transitioned into the $SiO_2$ feedstock vapor except for a remaining fraction of less than 20 ppm, preferably less than 10 ppm, particularly preferably less than 5 ppm. Said variant of an embodiment can be implemented by means of the evaporation methods disclosed herein. Said evaporation methods—in particular the combination of evaporation resulting from a drop in pressure and from a lowering of the dew point—enable that only very small fractions (less than 20 ppm, preferably less than 10 ppm, particularly preferably less than 5 ppm) of the $SiO_2$ feedstock material introduced in liquid form into the evaporator do not evaporate. In single experiments, it was possible to reduce the fraction of non-evaporated $SiO_2$ feedstock material to even less than 2.5 ppm.

In the scope of one embodiment of the invention, stating that "at least 99% by weight of the liquid $TiO_2$ feedstock material is evaporated to form the gaseous $TiO_2$ feedstock vapor" shall mean that at least 99% by weight of the liquid $TiO_2$ feedstock material flowing into the evaporation process are being transitioned into the gas phase. According to a goal of the method according to one embodiment of the invention, the conversion of the liquid TiO2 feedstock material into the gas phase proceeds such that it is complete. The gaseous $TiO_2$ feedstock vapor thus attained is then to be converted into $TiO_2$ particles by means of oxidation and/or pyrolysis and/or hydrolysis. A particularly preferred variant of an embodiment is characterised in that liquid $TiO_2$ feedstock material is transitioned into the $TiO_2$ feedstock vapor except for a remaining fraction of less than 20 ppm, preferably less than 10 ppm, particularly preferably less than 5 ppm. Said variant of an embodiment can be implemented by means of the evaporation methods disclosed herein. Said evaporation methods—in particular the combination of evaporation resulting from a drop in pressure and from a lowering of the dew point—enable that only very small fractions (less than 20 ppm, preferably less than 10 ppm, particularly preferably less than 5 ppm) of the $TiO_2$ feedstock material introduced in liquid form into the evaporator do not evaporate.

In the scope of one embodiment of the invention, the term, polyalkylsiloxane, shall encompass both linear and cyclical molecular structures. However, the polyalkylsiloxanes of the $SiO_2$ feedstock material preferably comprise at least three polymethylcyclosiloxanes selected from the group of hexamethylcyclotrisiloxane (D3), octamethylcyclotetrasiloxane (D4), decamethylcyclopentasiloxane (D5), dodecamethylcyclohexasiloxane (D6). The D3, D4, D5 terminology originates from a terminology introduced by General Electric Inc., in which "D" represents the $[(CH_3)_2Si]$-0-group. In a preferred variant, D4 is the main component of the polyalkylsiloxane base substance. Accordingly, the D4 fraction of the polyalkylsiloxane base substance is at least 70% by weight, in particular at least 80% by weight, preferably at least 90% by weight, particularly preferably at least 94% by weight.

In the scope of one embodiment of the invention, the terms, diluting agent, and, carrier gas, are used synonymously.

One refinement of the method is characterised in that the ratio mD3/mD5 is in the range of 0.1 to 0.5. The measurements that have been made surprisingly confirmed that adding D3 and D5 to the $SiO_2$ feedstock material containing mainly D4 attained a significant reduction of the inhomogeneities in the density of titanium-doped synthetic quartz glass only in a comparatively narrow range of D3 and D5. Several measurements showed that, in particular, at a mass ratio mD3 to mD5 of the additional components between 0.1 and 0.5, the soot body and thus the titanium-doped quartz glass produced from it comprised particularly few inhomogeneities.

It is essential in the method according to one embodiment of the invention that the $SiO_2$ feedstock material contains at least one additional component with a smaller relative molecular mass than D4 and at least one additional component with a larger relative molecular mass. During hydrolytic or pyrolytic decomposition of polyalkylsiloxanes, the activation energy of the oxidative attack or the thermal energy required for cleavage is presumed to increase with increasing molecular mass. The $SiO_2$ feedstock material supplemented with additional components is fed as a gas to a reaction zone and decomposes in the course of this process through oxidation and/or hydrolysis and/or pyrolysis to form $SiO_2$. The reaction zone is, for example, a torch flame or a plasma. In the reaction zone, the polyalkylsiloxane molecule is gradually decomposed by oxidative means to form $SiO_2$, whereby a primary $SiO_2$ particle is generated to which further SiO or $SiO_2$ molecules from the gas phase are added. The addition process ends on the path through the reaction zone in the direction of a deposition surface as soon as the agglomerated or aggregated $SiO_2$ particle enters a zone, in which no further non-decomposed molecules are available.

These cleavage, oxidation, and addition processes (summarised by the term of "particle formation process" hereinafter) proceed with different kinetics and different temperatures depending on the molecular mass and the size of the polyalkylsiloxane molecule. As a result of these processes, agglomerates and aggregates of varying size and having a comparatively broad particle size distribution are formed in the reaction zone. The particle formation process changes when the method according to one embodiment of the invention is used. The size distribution of the $SiO_2$ particles being formed is broader and thus the soot body structure is changed as compared to the use of pure D4. One possible explanation of the broadening of the particle size distribution is that the different kinetics in the gas phase also results in different kinetics of the formation of primary $SiO_2$ particles on which further growth can occur through the addition of further $SiO_2$ molecules from the gas phase. Another possible explanation is that, already, the size of the primary $SiO_2$ particles and the size of the $SiO_2$ particles formed from them and their concentration in the reaction zone may change during the hydrolysis or pyrolysis as a function of the number and configuration of the silicon atoms of the polyalkylsiloxane molecule.

The method according to one embodiment of the invention includes two central requirements. For one, at least 99% by weight of the liquid $SiO_2$ feedstock material provided must be transitioned to the gas phase. On the other hand, said evaporation must be implemented such that the $SiO_2$ feedstock material evaporates while maintaining the weight ratio of mD3 to mD5. Accordingly, according to one embodiment of the invention, the mass ratio of the two additional components in the liquid and in the gas phase is to be essentially identical. In this context, it has proven to be advantageous that the numerical value of a ratio of the weight ratio G_liquid=mD3/mD5 of the liquid $SiO_2$ feedstock material and the weight ratio G_vapor=mD3/mD5 of the gaseous $SiO_2$ feedstock material is maximally ±500 ppm, preferably is maximally ±250 ppm, particularly preferably is maximally ±100 ppm, whereby the ratio is calculated as follows: =(G_liquid−G_vapor)/G_liquid. It has been evident that adding two further polyalkylsiloxanes D3 and D5 to the main component D4 of the $SiO_2$ feedstock material attains a broadening of the particle size distribution.

In the scope of a variant of an embodiment, one embodiment of the invention provides the liquid SiO2 feedstock material to be transitioned completely into the gaseous SiO2 feedstock vapor. In the known evaporation systems, the liquid to be evaporated is contacted to a hot surface. The surfaces in evaporators can have an impact on the stability of the SiO2 feedstock material. In order to overcome said disadvantages, a resulting further advantageous variant of the evaporation process according to one embodiment of the invention is attained in that the evaporation comprises the following steps:

heating the SiO2 feedstock material, introducing the heated SiO2 feedstock material into an expansion chamber such that at least a first portion of the SiO2 feedstock material evaporates as a result of a drop in pressure.

The scope of said variant includes a heating of the SiO2 feedstock material. The temperatures of the SiO2 feedstock material are sought to be between 150 and 230° C. in this context. It has been found to be particularly gentle on the SiO2 feedstock material to have said evaporation proceed as the result of a drop in pressure. For this purpose, the SiO2 feedstock material can, for example, be heated as a supercritical liquid. Only the requisite pressure being established in the heating facility prevents the SiO2 feedstock material from boiling. Upon expansion inside the expansion chamber, the SiO2 feedstock material relaxes in such manner that it transitions into the gas phase. Drops in pressure between 1.8 and 5 bar have been found to be advantageous.

Another advantageous variant of the evaporation method according to one embodiment of the invention results from the evaporation comprising the following steps:

heating the SiO2 feedstock material;

introducing the heated SiO2 feedstock material into the expansion chamber;

mixing the SiO2 feedstock material with a heated diluting agent such that at least a second portion of the SiO2 feedstock material evaporates as a result of a lowering of the dew point.

In the scope of said variant of an embodiment, a diluting agent is utilised for evaporation of the feedstock material. The diluting agent advantageously is a carrier gas that flows through the expansion chamber. For this reason, the terms diluting agent and carrier gas are considered to be synonymous hereinafter.

The SiO2 feedstock material is introduced into the expansion chamber through a corresponding pipeline and nebulised and/or sprayed therein by means of a nebuliser nozzle. For the transition of the SiO2 feedstock material to the SiO2 feedstock vapor to proceed as homogeneously as possible, a diluting agent, such as nitrogen, should be introduced into the expansion chamber. The second portion of the liquid SiO2 feedstock material evaporates when it enters the expansion chamber, since the partial pressure of the liquid SiO2 feedstock material is reduced in the chamber and its dew point therefore decreases as well. The special feature of the method is that the reduction of the partial pressure also reduces the temperature at which the liquid SiO2 feedstock material transitions to the gas phase. Aside from nitrogen, argon or helium also have proven useful as carrier gases and/or diluting agents.

Another variant of an embodiment of the method according to one embodiment of the invention is characterised in that at least 99% by weight, in particular 99.95% by weight, particularly preferably 99.9995% by weight of the SiO2 feedstock material is transitioned into the SiO2 feedstock vapor as a result of the drop in pressure and/or lowering of the partial pressure. In order to attain complete conversion, it has proven to be advantageous that the liquid SiO2 feedstock material is nebulised into very fine droplets. The mean diameter of said droplets in this context should be less than 5 μm, preferably less than 2 μm, particularly preferably less than 1 μm. In order to support said splitting of the liquid into small droplets, it has proven to be expedient to use ultrasound nebulisers which lead to homogeneous and fine nebulisation of the SiO2 feedstock material through the action of ultrasound. In the scope of one embodiment of the invention, ultrasound shall mean sound of frequencies above the range perceived by man.

Another variant of an embodiment of the method according to one embodiment of the invention is characterised in that the liquid TiO2 feedstock material is transitioned in a nebuliser nozzle at room temperature at a defined pressure (e.g. between 1 and 5 bar) into very small droplets only a few micrometers in size. A carrier gas (diluting gas) is initially heated by means of a heat exchanger and mixed with the droplets in appropriate manner such that the evaporation proceeds mainly in the gas phase rather than on hot surfaces. This method can be designed appropriately such that there is no need to pre-heat the liquid TiO2 feedstock material. In this variant, a mixing of the carrier gas and of the liquid TiO2 feedstock material precedes the actual nebulising into droplets.

In the scope of a variant of an embodiment, one embodiment of the invention provides the liquid TiO2 feedstock material to be transitioned completely into the gaseous TiO2 feedstock vapor. In the known evaporation systems, the liquid to be evaporated is contacted to a hot surface. The surfaces in evaporators can have an impact on the stability of the TiO2 feedstock material. In order to overcome said disadvantages, a resulting further advantageous variant of the evaporation process according to one embodiment of the invention is attained in that the evaporation comprises the following steps:

heating the TiO2 feedstock material, introducing the heated TiO2 feedstock material into an expansion chamber such that at least a first portion of the TiO2 feedstock material evaporates as a result of a drop in pressure.

The scope of said variant includes a heating of the TiO2 feedstock material. The temperatures of the TiO2 feedstock material are sought to be between 150 and 230° C. in this context. It has proven to be advantageous to use a liquid/liquid heating system, in which the TiO2 feedstock material is heated by means of a further liquid, such as oil. A liquid-liquid heat exchanger effects homogeneous constant heating of the TiO2 feedstock material without singular hot areas being produced, such as is the case using electrical heating wires. It has been found to be particularly gentle on the TiO2 feedstock material to have said evaporation proceed as the result of a drop in pressure. For this purpose, the TiO2 feedstock material can, for example, be heated as a supercritical liquid. Only the requisite pressure being established in the heating facility prevents the TiO2 feedstock material from boiling. Upon expansion inside the expansion chamber, the TiO2 feedstock material relaxes in such manner that it transitions into the gas phase. Drops in pressure between 1.8 and 5 bar have been found to be advantageous.

Another advantageous variant of the evaporation method according to one embodiment of the invention results from the evaporation comprising the following steps:

heating the TiO2 feedstock material;

introducing the heated TiO2 feedstock material into the expansion chamber;

mixing the TiO2 feedstock material with a heated diluting agent such that at least a second portion of the TiO2 feedstock material evaporates as a result of a lowering of the dew point.

In the scope of said variant of an embodiment, a diluting agent is utilised for evaporation of the feedstock material. The diluting agent advantageously is a carrier gas that flows through the expansion chamber. For this reason, the terms diluting agent and carrier gas are considered to be synonymous hereinafter.

The scope of said variant of an embodiment also includes a heating of the TiO2 feedstock material. As illustrated above, it has proven to be advantageous that the heating proceeds by means of a heat exchanger and leads to heating of the TiO2 feedstock material to a temperature in the range of 120 to 230° C. The TiO2 feedstock material is introduced into the expansion chamber through a corresponding pipeline and nebulised and/or sprayed therein by means of a nebuliser nozzle. For the transition of the $TiO_2$ feedstock material to the $TiO_2$ feedstock vapor to proceed as homogeneously as possible, a diluting agent, such as nitrogen, should be introduced into the expansion chamber, in particular against the direction in which the $TiO_2$ feedstock material is sprayed in. The second portion of the liquid $TiO_2$ feedstock material evaporates when it enters the expansion chamber, since the partial pressure of the liquid $TiO_2$ feedstock material is reduced in the chamber and its dew point therefore decreases as well. The special feature of this method is that the lowering of the partial pressure also reduces the temperature at which the liquid $TiO_2$ feedstock material transitions to the gas phase. The dew point of the $TiO_2$ feedstock material decreases by up to 30° C. as a function of the quantity of heated carrier gas added. Accordingly, there is no need for strong heating of the $TiO_2$ feedstock material in the feed. Aside from nitrogen, argon or helium also have proven useful as carrier gases and/or diluting agents.

Another variant of an embodiment of the method according to one embodiment of the invention is characterised in that at least 99% by weight, in particular 99.95% by weight, particularly preferably 99.9995% by weight of the $TiO_2$ feedstock material is transitioned into the $TiO_2$ feedstock vapor as a result of the drop in pressure and/or lowering of the partial pressure. In an alternative of this embodiment, the transitioning of the liquid $TiO_2$ feedstock material into the gas phase proceeds only as a result of the drop in pressure when the heated and pressurised $TiO_2$ feedstock material enters the expansion chamber. In order to attain complete conversion in this context, it has proven to be advantageous that the liquid $TiO_2$ feedstock material is nebulised into very fine droplets. The mean diameter of said droplets in this context should be less than 5 μm, preferably less than 2 μm, particularly preferably less than 1 μm.

In order to support said splitting of the liquid into small droplets, it has proven to be expedient to use ultrasound nebulisers which lead to homogeneous and fine nebulisation of the $TiO_2$ feedstock material through the action of ultrasound. In the scope of one embodiment of the invention, ultrasound shall mean sound of frequencies above the range perceived by man. In the scope of the second alternative, the conversion of the liquid $TiO_2$ feedstock material into the vapor phase proceeds exclusively through utilisation of the carrier gas with the result of the partial pressure being lowered. In this context, sufficient quantities of the diluting agent/carrier gas need to flow through the expansion chamber and thus effect the evaporation of the liquid $TiO_2$ feedstock material. A third alternative of said variant of an embodiment of the method according to one embodiment of the invention provides the evaporation of the liquid feedstock material to proceed through utilisation of both the drop in pressure and the lowering of the partial pressure. Said combination of evaporation resulting from a drop in pressure and from a lowering of the dew point enables that only very small fractions (less than 20 ppm, preferably less than 10 ppm, particularly preferably less than 5 ppm) of the $TiO_2$ feedstock material introduced in liquid form into the evaporator do not evaporate. In single experiments, it was possible to reduce the fraction of non-evaporated $TiO_2$ feedstock material to even less than 2.5 ppm.

The liquid $TiO_2$ feedstock material can be transitioned into the gas phase more easily and more homogeneously, if the individual quantities to be evaporated in each case are small and have a large surface. This can be attained best through nebulising the liquid $TiO_2$ feedstock material into fine droplets. The nebulised droplets can then be transitioned into the gas phase by means of the drop in pressure and/or the mixing with the heated diluting agent/carrier gas. It has proven to be expedient to have the fine droplets contact the hot carrier gas in a chamber that is maintained at a temperature in the range of 150° C. to 230° C. At a temperature below 150° C., there is a certain risk that droplets do not evaporate completely such that liquid is carried along into the reaction zone which leads to inhomogeneities in the particle formation process and defects in the soot body structure, such as bubbles. At temperatures above 230° C., there is an increasing tendency of reactions to proceed that are otherwise energetically inhibited and have non-reproducible and undesired reaction products, in particular decomposition and polymerisation reactions.

Another variant of an embodiment of the method according to one embodiment of the invention is characterised in that the liquid $TiO_2$ feedstock material is transitioned in a nebuliser nozzle at room temperature at a defined pressure (e.g. between 1 and 5 bar) into very small droplets only a few micrometers in size. A carrier gas (diluting gas) is initially heated by means of a heat exchanger and mixed with the droplets in appropriate manner such that the evaporation proceeds mainly in the gas phase rather than on hot surfaces. This method can be designed appropriately such that there is no need to pre-heat the liquid $TiO_2$ feedstock material. In this variant, a mixing of the carrier gas and liquid $TiO_2$ feedstock material precedes the actual nebulising into droplets.

Another variant of an embodiment of the method according to one embodiment of the invention is characterised in that at least 99% by weight of the liquid $TiO_2$ feedstock material is evaporated to form gaseous $TiO_2$ feedstock vapor. Moreover, a variant of an embodiment of the method according to one embodiment of the invention is characterised in that the polyalkylsiloxane D3 having a weight fraction of mD3 and the liquid $TiO_2$ feedstock material having a weight fraction of $mTiO_2$ are evaporated at a weight ratio of $mTiO_2/mD3$ in a range of 0.1 to 10.

Another variant of an embodiment of the method according to one embodiment of the invention is characterised in that the liquid $TiO_2$ feedstock material comprises less than 2 ppm by weight of water. This supports the formation of a homogeneous quartz glass body. Another variant of an embodiment of the method according to one embodiment of the invention is characterised in that the liquid $TiO_2$ feedstock material comprises at least 80% by weight titanium isopropoxide ($Ti\{OCH(CH_3)_2\}_4$).

Another advantageous variant of an embodiment of the method according to the invention is characterised in that the additional component D3 and/or the additional component D5 account(s) for between 0.5% by weight and 30% by weight of a total weight of the liquid $SiO_2$ feedstock material, in particular in that the sum of weight fractions mD3+ mD5 is in the range of 1 to 15% by weight, preferably between 1 and 3% by weight. Surprising measurements have shown that the additional components, D3 and D5, do not have to predominate in the $SiO_2$ feedstock material. Rather, admixtures of maximally one third of the total weight are sufficient to produce an $SiO_2$ feedstock material as claimed according to one embodiment of the invention, which, when deposited as $SiO_2$ particles, leads to a broadening of the particle size and thus to increased homogeneity of the soot body thus produced. Accordingly, a majority of the measurements surprisingly showed that even weight fractions of the additional components D3 and D5 between 1 and 3% by weight are sufficient. Even these comparatively small quantities of additional components D3, D5 cause, by means of the transition into the gas phase being complete, density variations that are possibly present in the soot body to be balanced out by the different particle sizes of the $SiO_2$ vapor such that, taken together, a significantly more homogeneous soot body and/or quartz glass body is generated.

Soot bodies produced according to the prior art have a density of 25 to 32% relative to the density of quartz glass. In this context, the soot bodies show a relative density variation of 3 to 4%. Said density variations are also transferred into the quartz glass body during the vitrification. This results in radial, azimuthal, and axial variations of the hydroxyl groups or chlorine concentrations that can lead to the quartz glass cylinder and the EUV mirror substrates produced from it having less favourable properties. The method according to one embodiment of the invention is characterised in that the known density variations in the soot body are reduced. Since said reduction of the density variations has a direct impact on the quality of the quartz glass cylinder, more homogeneous quartz glass cylinders of accordingly higher quality were produced. This is advantageous in that the later use of the quartz glass cylinders, for example in the production of EUV mirror substrates, is associated with less scrap being generated.

Many of the measuring results indicate that the activation energy required for decomposition of the polyalkylsiloxanes is lower in the case of the polyalkylsiloxane D3 as compared to D4 and is higher in the case of the polyalkylsiloxane D5 as compared to D4. The activation energy of the polyalkylsiloxane D3 is lower since the ring tension of said molecule is higher. Accordingly, the ring can be opened more readily than in the case of the more stable D4. In contrast, it appears evident that the polyalkylsiloxane D5 requires a higher activation energy than D4 in order to initiate thermal cleavage of the molecule. Taken together, it has been evident, though, that the energy difference between D4 and D3 is larger than between D4 and D5. For this reason, and because D3 has a stronger tendency to undergo polymerisation reactions, it has proven to be advantageous that the quantity of the additional component D3 is lower than the quantity of the additional component D5. Accordingly, an advantageous variant of an embodiment of the method according to one embodiment of the invention is characterised in that the additional components comprise the following quantities of polyalkylsiloxanes and their linear homologs:

hexamethylcyclotrisiloxane (D3): weight fraction mD3 in the range of 0.02% by weight to 1% by weight;

decamethylcyclopentasiloxane (D5) weight fraction mD5 in the range of 0.5% by weight to 5% by weight.

Measurements surprisingly confirmed that the density variations within the soot bodies were less than 0.4% when the quantities of additional components as specified above were used. A further improvement of the density variations of the soot bodies resulted when the additional components comprised the following quantities of polyalkylsiloxanes and their linear homologs:

hexamethylcyclotrisiloxane (D3): weight fraction mD3 in the range of 0.02% by weight to 2% by weight;

decamethylcyclopentasiloxane (D5) weight fraction mD5 in the range of 0.5% by weight to 10% by weight.

In some of the measurements, D6 was also added at a weight fraction $m_{D6}$ in the range of 0.01% by weight and 0.75% by weight. This was generally done by replacing the corresponding quantity of D5. However, due to their large molecular mass, dodecamethylcyclopentasiloxane and the linear homologs thereof effect a noticeable change of the reaction zone and particle formation process at lower concentration as compared to D4 such that the weight fraction of D6 preferably is not more than 100 ppm by weight.

Another advantageous variant of an embodiment of the method according to one embodiment of the invention is characterised in that the TiO2 concentration of the synthetic quartz glass is between 7% by weight and 10% by weight, in particular between 7.8% by weight and 8.9% by weight. This is the appropriate quantity for a thermal expansion coefficient as needed for EUV mirrors. Alternatively or in addition, a further advantageous variant of an embodiment of the method according to one embodiment of the invention is characterised in that the Ti3+ concentration of the synthetic quartz glass is between 1 ppm and 200 ppm, in particular between 1 ppm and 50 ppm, in particular between 1 ppm and 20 ppm. This parameter also is useful for adjusting the thermal expansion coefficient.

A further advantageous variant of an embodiment of the method according to one embodiment of the invention is characterised in that a variation Ti3+/Ti3+ of the Ti3+ concentration of the synthetic quartz glass at a surface used for optical purposes is 0.8 or less, in particular is between 0.0002 and 0.5. A further advantageous variant of an embodiment of the method according to one embodiment of the invention is characterised in that the internal transmission at a path length of 1 mm in a wavelength range from 400 nm to 700 nm is at least 80%, in particular is at least 90%. A further advantageous variant of an embodiment of the method according to one embodiment of the invention is characterised in that a fictive temperature of the synthetic quartz glass is maximally 1,050° C., in particular maximally 1,000° C., particularly preferably maximally 950° C.

A further advantageous variant of an embodiment of the method according to one embodiment of the invention is characterised in that the thermal expansion coefficient in a temperature window from 0° C. to 100° C. is maximally 0±150 ppb/° C., in particular maximally 0±100 ppb/° C., preferably maximally 0±75 ppb/° C.

A further advantageous variant of an embodiment of the method according to one embodiment of the invention is characterised in that the titanium-doped $SiO_2$ soot body is doped with fluorine. For this purpose, the titanium-doped $SiO_2$ soot body can be placed in a doping furnace and exposed to a fluorine-containing atmosphere in the doping furnace.

Another advantageous variant of an embodiment of the method according to one embodiment of the invention is characterised in that the method comprises the following steps:

transforming a liquid fluorine feedstock material into a gaseous fluorine feedstock vapor;

converting the fluorine feedstock vapor into fluorine particles;

applying the fluorine particles jointly with the SiO2 particles and the TiO2 particles onto the deposition surface while forming a titanium- and fluorine-doped SiO2 soot body.

It has been evident that fluorine also has beneficial effects on the homogeneity of the titanium doping within the soot body. For this reason, a further advantageous variant of an embodiment of the method according to one embodiment of the invention is characterised in that the fluorine concentration of the synthetic quartz glass is at least 100 ppm by weight.

One embodiment of the invention also claims the use of a synthetic quartz glass produced according to the method disclosed herein, whereby the synthetic quartz glass is used for producing EUV mirror substrates. (In this context, EUV means "extreme ultraviolet radiation", i.e. the spectral range between 10 nm and 121 nm). The method disclosed herein enables the production of quartz glass of very high quality. Since the density variations of the soot body are minor, it is feasible to produce high quality quartz glasses that are preferably used for EUV mirror substrates.

Figure 1:
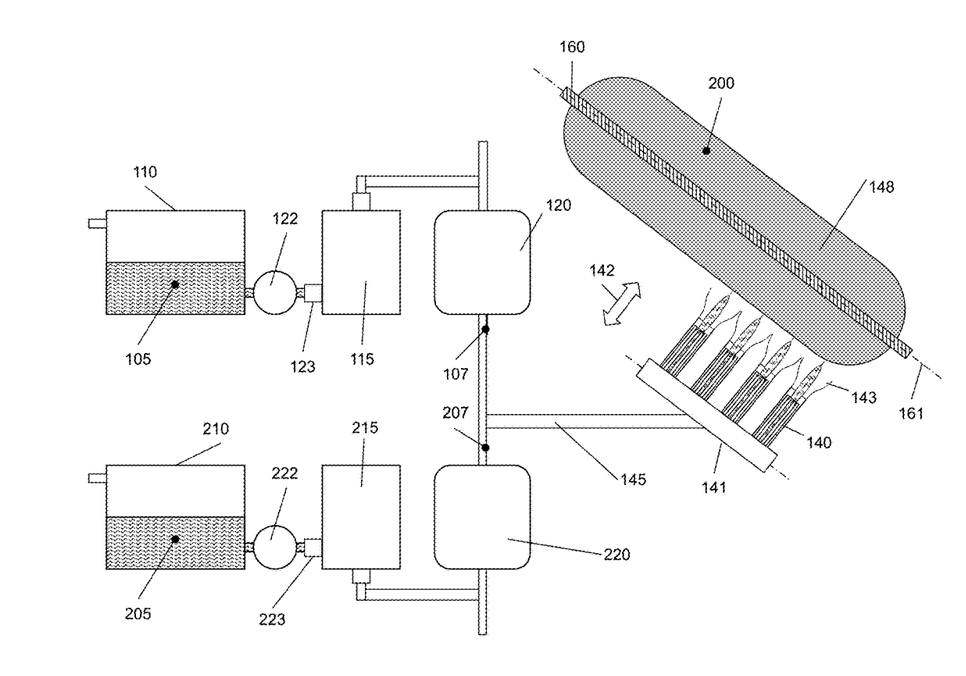
FIG. 1 shows a schematic view of a device for implementing the method according to the invention for producing an $SiO_2$ soot body.

It is known according to the prior art to use the polyalkylsiloxane, octamethylcyclotetrasiloxane (D4), to produce quartz glass. However, the known production methods can only be used to produce synthetic quartz glasses comprising a certain layered structure. It is one of the goals of one embodiment of the present invention to overcome said disadvantage—the areas of local variation in density and/or chemical composition—in the production of titanium-doped quartz glass. In this context, the method according to one embodiment of the invention is based on the formation of a gas flow from an SiO$_2$ feedstock vapor 107, which contains D4 as main component, and from a TiO$_2$ feedstock vapor 207. The gas flow is fed to a reaction zone, in which the SiO$_2$ feedstock vapor and the TiO$_2$ feedstock vapor are converted by means of pyrolysis, oxidation or hydrolysis into titanium-doped SiO$_2$ 148 while forming amorphous, titanium-doped SiO$_2$ particles.

The subsequent deposition of the amorphous SiO$_2$ particles on a deposition surface 160 leads to the formation of a porous titanium-doped SiO$_2$ soot body 200 that forms a synthetic titanium-doped quartz glass by way of vitrification. In order to enable in this context the production of large-volume cylinder-shaped soot bodies 200 having external diameters of more than 300 mm and improved homogeneity of the materials, one embodiment of the invention discloses that the starting material D4 comprises at least two additional components in the form of two further polyalkylsiloxanes. Rather than being arbitrary polyalkylsiloxanes, these are a polyalkylsiloxane having a molecular mass that is lower than the reference molecular mass of D4 and a polyalkylsiloxane having a molecular mass that is higher than the reference molecular mass of D4. Measurements have surprisingly shown that using a heavier and a lighter-weight polyalkylsiloxane in combination with the D4 base material leads to a broadening of the particle size distribution of the primary SiO$_2$ particles. In addition, the variation of the width of the particle size distribution is less than in comparable methods for producing synthetic quartz glass, in particular of titanium-doped synthetic quartz glass using, e.g., D4 or SiCl4 exclusively.

The device shown in FIG. 1 serves for producing a titanium-doped SiO$_2$ soot body 200. A plurality of flame hydrolysis torches 140 arranged in a row is arranged along a support tube 160 made of aluminium oxide. In a modification of the method aimed at attaining higher productivity, a plurality of deposition torches is used rather than a single torch 140 and moved back and forth along the rotating support for soot deposition, whereby each of the torch flames passes only over part of the length of the support tube 160.

The SiO$_2$ feedstock material 105 enriched, according to one embodiment of the invention, in additional components is fed as a gas to the reaction zone and decomposes in the course of this process through oxidation and/or hydrolysis and/or pyrolysis to form SiO$_2$. The reaction zone is, for example, a torch flame or a plasma. SiO$_2$ particles 148 are generated in the reaction zone and are deposited on the deposition surface 160 in the form of layers while the SiO$_2$ soot body is being formed. The SiO$_2$ particles 148 as such are present in the form of agglomerates or aggregates of primary SiO$_2$ particles of particle sizes in the nanometer range.

The TiO$_2$ feedstock material 205 is fed as a gas to the reaction zone and decomposes in the course of this process through oxidation and/or hydrolysis and/or pyrolysis to form TiO$_2$. The reaction zone is, for example, a torch flame or a plasma. TiO$_2$ particles 148 are generated in the reaction zone and are deposited on the deposition surface 160 while the titanium-doped SiO$_2$ soot body is being formed.

The flame hydrolysis torches 140 are installed on a joint torch block 141 that is shifted back and forth parallel to the longitudinal axis 161 of the support tube 160 between two reversal points that are fixed in place with respect to the longitudinal axis 161, and that can be shifted perpendicular to this arrangement as indicated through the direction arrows 142. The torches 140 consist of quartz glass; the distance between their centres is 10 to 18 cm.

The flame hydrolysis torches 140 each have a torch flame 143 assigned to them, which each represent a reaction zone in the scope of one embodiment of the invention. In the reaction zone, TiO$_2$ and/or SiO$_2$ particles are formed and deposited on the cylinder jacket surface of the support tube 160 that rotates about its longitudinal axis 161 such that a soot body 6 having an external diameter of 350 mm is built-up layer-by-layer. During the deposition process, a temperature of approx. 1,200° C. becomes established on the soot body surface 200.

Oxygen and hydrogen are fed as torch gases to each of the flame hydrolysis torches 140 and the SiO$_2$ feedstock vapor 107 is supplied as feedstock material for formation of the SiO$_2$ particles and/or and the TiO$_2$ feedstock vapor 207 is supplied as feedstock material for formation of the TiO$_2$ particles.

The production of the SiO$_2$ feedstock vapor 107 by means of the mixture of polyalkylsiloxanes proceeds by means of an evaporator system 120 that comprises a reservoir 110 for the liquid mixture, a liquid pump 122, and a flow meter 123 for liquids. The reservoir 110, a pump 122, and a nebuliser 128 are connected to each other by means of flexible metallic lines. The reservoir 110 is heated to a temperature of 170° C. and the heated liquid is fed to the evaporator 120 by means of the pump 122. The production of the TiO$_2$ feedstock vapor 207 also proceeds by means of an evaporator system 220 that comprises a reservoir 210 for the liquid TiO2 mixture, a liquid pump 222, and a flow meter 223.

The evaporator 120 has an internal temperature of 195° C. such that the fine droplets of liquid evaporate directly and the vapor flow is fed to a stationary flow divider and distributed by same through heat-insulated flexible media supply lines to the individual deposition torches 140.

Upon completion of the deposition process, a hollow cylinder made of porous titanium-doped SiO₂ soot (soot tube) is obtained and subjected to a computer tomographic inspection (CT inspection). This involves X-rays being radiated through the soot tube 200 over its entire length. The images thus obtained allow quantitative and qualitative statements to be made concerning the intensity and homogeneity of the axial and radial layer structure of the soot cylinder 200.

It has been evident that fluorine also has a beneficial effect on the homogeneity of titanium doping within through the following steps:

transforming a liquid fluorine feedstock material into a gaseous fluorine feedstock vapor and converting the SiO₂ feedstock vapor (107), the TiO2 feedstock vapor, the fluorine feedstock vapor into SiO2 particles and TiO2 particles and fluorine particles;

depositing the SiO2 particles, TiO2 particles, and fluorine particles on a deposition surface while forming a titanium- and fluorine-doped SiO₂ soot body (200);

vitrifying the titanium- and fluorine-doped SiO₂ soot body while the formation of the synthetic quartz glass proceeds, whereby the fluorine concentration of the synthetic quartz glass is at least 100 ppm by weight.

As illustrated above, it is [a] goal of the method according to one embodiment of the invention to completely transition the liquid SiO₂ feedstock material, which is made up by a plurality of polyalkylsiloxanes, to the gas phase while maintaining the weight ratios of the additional components D3 and D5 during this process. According to our surprising insight, the addition of additional components D3 and D5 into a D4 liquid results in an SiO₂ feedstock material by means of which particularly homogeneous, titanium-doped SiO₂ soot bodies can be built up. Advantageously, the D4 starting material comprises less than 500 ppm in impurities in this context, whereby, in particular, all polyalkylsiloxanes other than D3, D4 or D5 are considered to be impurities.

The invention claimed is:

1. A method for producing titanium-doped synthetic quartz glass comprising:
    (A) providing a liquid SiO₂ feedstock material comprising more than 60% by weight of the polyalkylsiloxane D4;
    (B) evaporating the liquid SiO₂ feedstock material to produce a gaseous SiO₂ feedstock vapor;
    (C) evaporating a liquid TiO2 feedstock material to produce a gaseous TiO2 feedstock vapor;
    (D) converting the SiO₂ feedstock vapor and the TiO2 feedstock vapor into SiO2 particles and TiO2 particles, respectively;
    (E) depositing the SiO2 particles and the TiO2 particles on a deposition surface while forming a titanium-doped SiO₂ soot body;
    (F) vitrifying the titanium-doped SiO₂ soot body while forming the synthetic quartz glass, whereby the TiO2 concentration of the synthetic quartz glass is between 5% by weight and 11% by weight;
    wherein the liquid SiO₂ feedstock material comprises at least one additional component made of the polyalkylsiloxane D3 having a weight fraction of mD3 and one additional component made of the polyalkylsiloxane D5 having a weight fraction of mD5 at a weight ratio of mD3/mD5 in a range of 0.01 to 1, and the liquid SiO₂ feedstock material provided is evaporated while maintaining the weight ratio of mD3/mD5 and at least 99% by weight thereof are evaporated to form the gaseous SiO₂ feedstock vapor.

2. The method according to claim 1, wherein the evaporation comprises:
    heating the TiO2 feedstock material; and
    introducing the heated TiO2 feedstock material into an expansion chamber such that at least a first portion of the TiO2 feedstock material evaporates as a result of a drop in pressure.

3. The method according to claim 1, wherein the evaporation comprises:
    heating the TiO2 feedstock material;
    introducing the heated TiO2 feedstock material into an expansion chamber; and
    mixing the TiO2 feedstock material with a heated diluting agent such that at least a second portion of the TiO2 feedstock material evaporates as a result of a lowering of the dew point.

4. The method according to claim 2, wherein at least 99.95% by weight of the TiO2 feedstock material is transitioned into the TiO₂ feedstock vapor as a result of the drop in pressure and/or lowering of the partial pressure.

5. The method according to claim 1, wherein the TiO2 concentration of the synthetic quartz glass is between 7% by weight and 10% by weight.

6. The method according to claim 5, wherein the TiO2 concentration of the synthetic quartz glass is between 7.8% by weight and 8.9% by weight.

7. The method according to claim 1, wherein the Ti3+ concentration of the synthetic quartz glass is between 1 ppm and 200 ppm.

8. The method according to claim 7, wherein the Ti3+ concentration of the synthetic quartz glass is between 1 ppm and 20 ppm.

9. The method according to claim 1, wherein a variation ☐Ti3+/Ti3+ of the Ti3+ concentration of the synthetic quartz glass at a surface used for optical purposes is 0.8 or less.

10. The method according to claim 9, wherein a variation ☐Ti3+/Ti3+ of the Ti3+ concentration of the synthetic quartz glass at a surface used for optical purposes is between 0.0002 and 0.5.

11. The method according to claim 1, wherein the internal transmission at a path length of 1 mm in a wavelength range from 400 nm to 700 nm is at least 80%.

12. The method according to claim 11, wherein the internal transmission at a path length of 1 mm in a wavelength range from 400 nm to 700 nm is at least 90%.

13. The method according to claim 1, wherein a fictive temperature of the synthetic quartz glass is maximally 1,050° C.

14. The method according to claim 13, wherein a fictive temperature of the synthetic quartz glass is maximally 950° C.

15. The method according to claim 1, wherein the thermal expansion coefficient in a temperature window from 0° C. to 100° C. is maximally 0±150 ppb/° C.

16. The method according to claim 1, wherein the titanium-doped SiO₂ soot body is doped with fluorine.

17. The method according to claim 16, wherein the fluorine concentration of the synthetic quartz glass is at least 100 ppm by weight.

18. The method according to claim 1, wherein the polyalkylsiloxane D3, which has a weight fraction of mD3, and the liquid TiO2 feedstock material, which has a weight fraction of mTiO2, are evaporated at a weight ratio of mTiO2/mD3 in a range of 0.1 to 10.

19. The method according to claim 1, wherein the liquid TiO2 feedstock material comprises at least 80% by weight titanium isopropoxide (Ti{OCH(CH3)2}4).

20. A method comprising:
producing a synthetic quartz glass according to claim 1; and
producing EUV mirror substrates from the synthetic quartz glass.

* * * * *